No. 670,568. Patented Mar. 26, 1901.
W. H. SPENCER.
FRUIT GATHERER.
(Application filed Jan. 2, 1901.)
(No Model.)
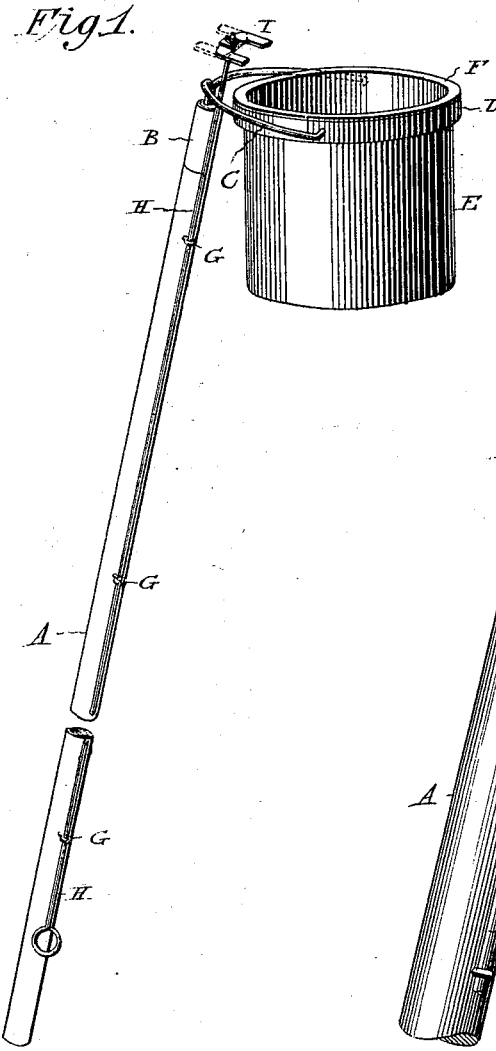
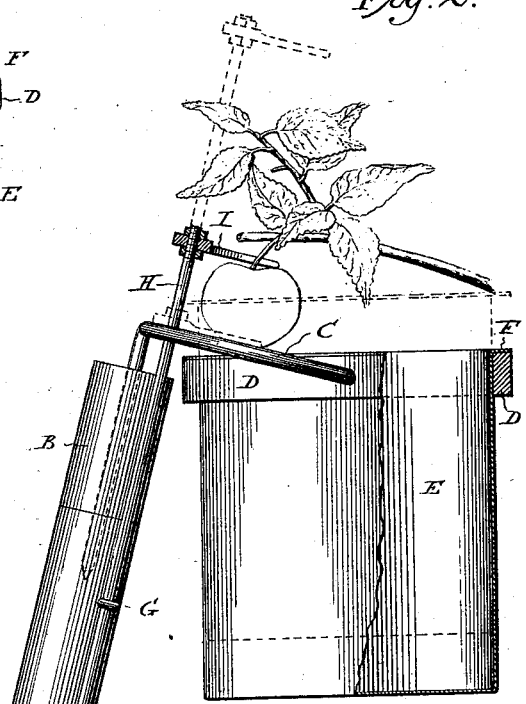
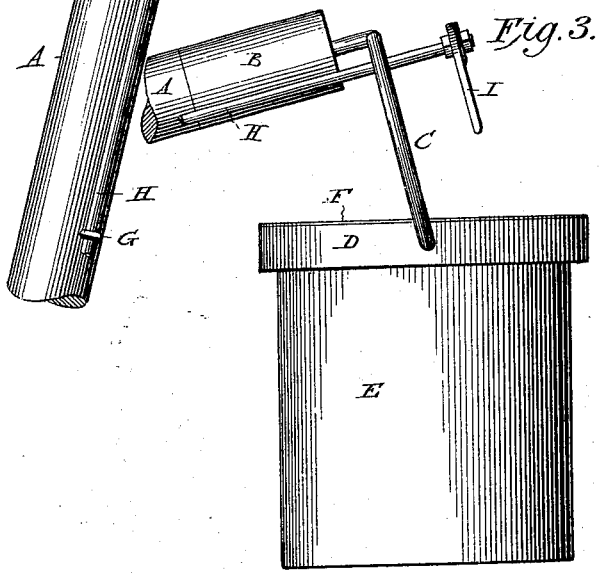
Witnesses
Inventor:
William H. Spencer,
by Dodge and Sons,
Attorneys.

UNITED STATES PATENT OFFICE.

WILLIAM HENRY SPENCER, OF KEOKUK, IOWA.

FRUIT-GATHERER.

SPECIFICATION forming part of Letters Patent No. 670,568, dated March 26, 1901.

Application filed January 2, 1901. Serial No. 41,862. (No model.)

*To all whom it may concern:*

Be it known that I, WILLIAM HENRY SPENCER, a citizen of the United States, residing at Keokuk, in the county of Lee and State of Iowa, have invented certain new and useful Improvements in Fruit-Gatherers, of which the following is a specification.

My present invention pertains to improvements in fruit-gatherers, the construction and advantages of which will be hereinafter set forth, reference being had to the annexed drawings, wherein—

Figure 1 is a perspective view of the device as a whole; Fig. 2, a side elevation of the same, portions being broken away to show certain parts in section; and Fig. 3, a similar view showing the position of the bucket or receptacle with relation to the handle and gathering or detaching device.

One object of my invention is to provide a simple and at the same time efficient fruit-gatherer in which the bucket or receptacle into which the fruit drops will always maintain its perpendicular position no matter what may be the inclination or position of the handle and the fruit-detaching device.

A further object of my invention is to provide a construction wherein the filled bucket or receptacle may be readily detached from its support and an empty one substituted therefor, whereby the usual handling of the fruit is avoided, the filled receptacle being carried away and the fruit therein deposited at the storage-place or put into barrels or packing-receptacles, as desired.

Referring to the drawings, A designates a pole or support, preferably formed of a light tough wood, of convenient length and provided at its upper end with a ferrule or ring B to strengthen and prevent it from splitting.

Secured to the upper end of the pole is a yoke C, the ends of which are bent or turned inward toward each other and pass into openings formed in a ring or collar D. The yoke and collar are so proportioned that the collar may swing freely within the yoke.

A bucket or receptacle E is mounted within and supported by ring D, the outturned edge or flange F of said bucket or receptacle resting upon the upper face or edge of the ring. This flange constitutes the sole means of attachment between the bucket and the ring and, as will be readily understood, permits easy withdrawal of the bucket or receptacle from the ring.

Secured upon the pole or handle is a series of guides or eyes G, through which passes a rod H, carrying at its upper end a U-shaped fruit-detaching member I. Rod H passes freely through said guides or eyes, and therefore may be raised, as indicated in Fig. 2, or turned to one side, as shown in dotted lines, Fig. 1, in either of which positions the bucket may be readily removed from the swiveled supporting-ring.

The operation and use of the device are apparent. The bucket or receptacle is brought to position beneath the fruit and the detaching member brought down thereon, as indicated in Fig. 2, the detached fruit dropping into the receptacle below. No matter what may be the angle or inclination of the handle or pole, owing to its swivel-support at the upper end the bucket or receptacle will always maintain its perpendicular position, so that it may be filled without fear of the contents spilling.

Having thus described my invention, what I claim is—

1. In a fruit-gathering device, the combination of a pole or handle; a yoke connected thereto and standing to one side of the same; a ring swiveled to said yoke; a receptacle removably mounted in said ring; and a fruit-detaching device mounted on the pole and working over the receptacle.

2. In a fruit-gathering device, the combination of a pole or handle; a yoke secured to the upper end thereof; a ring swiveled intermediate the ends of said yoke; a receptacle provided at its upper edge with an outwardly-turned flange, said flange resting on the ring when the receptacle is in place; and a fruit-detaching device mounted on the pole and working over the receptacle.

3. In a fruit-gathering device, the combination of a pole or handle; a yoke secured to the upper end thereof; a ring swiveled in said yoke; a receptacle removably mounted in said ring; and a rod mounted on the pole and carrying a fruit-detaching device at its upper end, said rod being movable in the direction of its length and also rotatable, substantially as and for the purpose described.

In testimony whereof I have signed my name to this specification in the presence of two subscribing witnesses.

WILLIAM HENRY SPENCER.

Witnesses:
D. MOORE DAVIS,
W. L. MCNAMARA.